United States Patent
Srinivasan

(10) Patent No.: US 9,531,641 B2
(45) Date of Patent: Dec. 27, 2016

(54) VIRTUAL OUTPUT QUEUE LINKED LIST MANAGEMENT SCHEME FOR SWITCH FABRIC

(71) Applicant: Oracle International Corporation, Redwood City, CA (US)

(72) Inventor: Arvind Srinivasan, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 248 days.

(21) Appl. No.: 14/445,344

(22) Filed: Jul. 29, 2014

(65) Prior Publication Data

US 2016/0036731 A1 Feb. 4, 2016

(51) Int. Cl.
*H04L 12/931* (2013.01)
*H04L 12/935* (2013.01)
*H04L 12/933* (2013.01)
*H04L 12/883* (2013.01)

(52) U.S. Cl.
CPC ......... *H04L 49/108* (2013.01); *H04L 49/9015* (2013.01)

(58) Field of Classification Search
None
See application file for complete search history.

(56) References Cited

U.S. PATENT DOCUMENTS

| | | | | |
|---|---|---|---|---|
| 7,088,710 B1* | 8/2006 | Johnson | ................... | H04L 12/64 370/357 |
| 7,194,661 B1* | 3/2007 | Payson | ............... | H04L 12/2697 370/242 |
| 8,797,877 B1* | 8/2014 | Perla | ....................... | H04L 49/00 370/230 |
| 2004/0100980 A1* | 5/2004 | Jacobs | ..................... | H04L 49/90 370/412 |
| 2006/0067347 A1* | 3/2006 | Naik | .................... | H04L 12/5693 370/412 |
| 2007/0195761 A1* | 8/2007 | Tatar | .................... | H04L 49/1546 370/389 |
| 2008/0304503 A1* | 12/2008 | Blake | ................... | H04L 12/5693 370/412 |
| 2013/0003725 A1* | 1/2013 | Hendel | ................. | H04L 49/505 370/353 |
| 2014/0317333 A1* | 10/2014 | Dorst | ....................... | G06F 13/28 710/308 |

\* cited by examiner

*Primary Examiner* — Chi H Pham
*Assistant Examiner* — Soon-Dong D Hyun
(74) *Attorney, Agent, or Firm* — Polsinelli PC

(57) ABSTRACT

Implementations of the present disclosure involve an apparatus, device, component, and/or method for a virtual output queue linked list management scheme for a high-performance network switch. In general, the linked list management scheme utilizes one or more look-ahead links associated with one or more descriptors in the linked list of descriptors that describe the storage of the incoming data packets to the switch. The look-ahead links allow the switch to schedule reads of memory locations included in the descriptors at the same speed at which the data packets are stored in memory.

17 Claims, 6 Drawing Sheets

VIRTUAL OUTPUT QUEUE LINKED LIST MANAGEMENT SCHEME FOR SWITCH FABRIC

FIELD OF THE DISCLOSURE

Aspects of the present invention relate to switched fabric computer network devices and, more particularly, aspects of the present invention involve an efficient linked list management scheme for virtual output queues of a switch fabric device.

BACKGROUND

High performance network fabric switches are utilized in networking environment to provide switching functionality for high performance computing and/or enterprise data centers. One type of such a high performance fabric switch is an Infiniband network fabric switch. For example, an Infiniband fabric switch may provide up to 100 Gbit/s switching on 42 input/output ports. The fabric switch provides switching capabilities to a network to spread traffic on the network across multiple physical links between the components of the network.

The performance of an Infiniband switch may depend on the switching efficiency of the switch and the arbitration time required to switch between ports. In general, the faster that the fabric switch reliably processes the data received at the switch, the higher the performance of the switch. To ensure that each data packet received by the switch is transmitted out of the correct output port of the switch, many switches utilize what is known as virtual output queues (VOQ). A VOQ is a queuing scheme for the input ports of the switch. Each input port to the switch may maintain a VOQ for each output of the switch, or virtual lane (VL) of the output ports of the switch. The VOQ scheme is typically able to provide a high speed mapping of packets from inputs to outputs on a cycle-by-cycle basis. However, to meet the high throughput and low latency requirements of a high-performance switch, the VOQ management scheme for such a switch often times has negative implications on the overall system power consumption and valuable chip area.

It is with these and other issues in mind that various aspects of the present disclosure were developed.

SUMMARY

One implementation of the present disclosure may take the form of a method for managing a virtual output queue for a network fabric switch. The method includes the operation of maintaining a linked list of a plurality of descriptors. Each of the plurality of descriptors comprises a memory address location at which at least a portion of data from an input data packet is stored, a next descriptor pointer indicating a next descriptor in the linked list of the plurality of descriptors, and a look ahead pointer indicating a look ahead descriptor in the linked list of the plurality of descriptors, the look ahead descriptor the next descriptor in the linked list following the next descriptor. Further, obtaining the at least a portion of data from the input data packet comprises scheduling a read of the next descriptor based at least on the next descriptor pointer and a read of the look ahead descriptor based at least on the look ahead pointer.

Another implementation of the present disclosure may take the form of a network fabric switch. The fabric switch includes a plurality of input/output (I/O) ports, each I/O port configured receive data packets from a network and a fabric switch controller configured to maintain a virtual output queue for each of the other I/O ports of the plurality of I/O ports, each virtual output queue comprising a linked list of a plurality of descriptors. In addition, each of the plurality of descriptors comprises a memory address location at which at least a portion of data from an input data packet received at least one of the plurality of I/O ports is stored, a next descriptor pointer indicating a next descriptor in the linked list of the plurality of descriptors and a look ahead pointer indicating a look ahead descriptor in the linked list of the plurality of descriptors, the look ahead descriptor the next descriptor in the linked list following the next descriptor.

DETAILED DESCRIPTION

Implementations of the present disclosure involve an apparatus, device, component, and/or method for a virtual output queue (VOQ) linked list management scheme for a high-performance network switch. In general, the linked list management scheme utilizes one or more look-ahead links associated with one or more descriptors in the linked list of descriptors that describe the storage of the incoming data packets to the switch. The look-ahead links allow the switch to schedule reads of memory locations included in the descriptors at the same speed at which the data packets are stored in memory. In particular, not only is a pointer to the next descriptor in the linked list read from a current descriptor when accessing the linked list, but a pointer to the descriptor following the next descriptor in the linked list may also read from the current descriptor. As such, the reads to the memory locations indicated in both the next descriptor and the descriptor following the next descriptor can be scheduled at the same time. This scheme thereby increases the rate at which the data from incoming packets may be stored and read. In other words, data may be retrieved from the stored memory at a rate similar to the rate at which the data may be stored, thereby increasing the performance of the switch. In addition, the management scheme may be scalable to adjust to changes in datapath width or incoming packet latency. In this manner, long queues within the VOQs of the switch may be avoided and the efficiency of the switch is increased.

Figure 1:
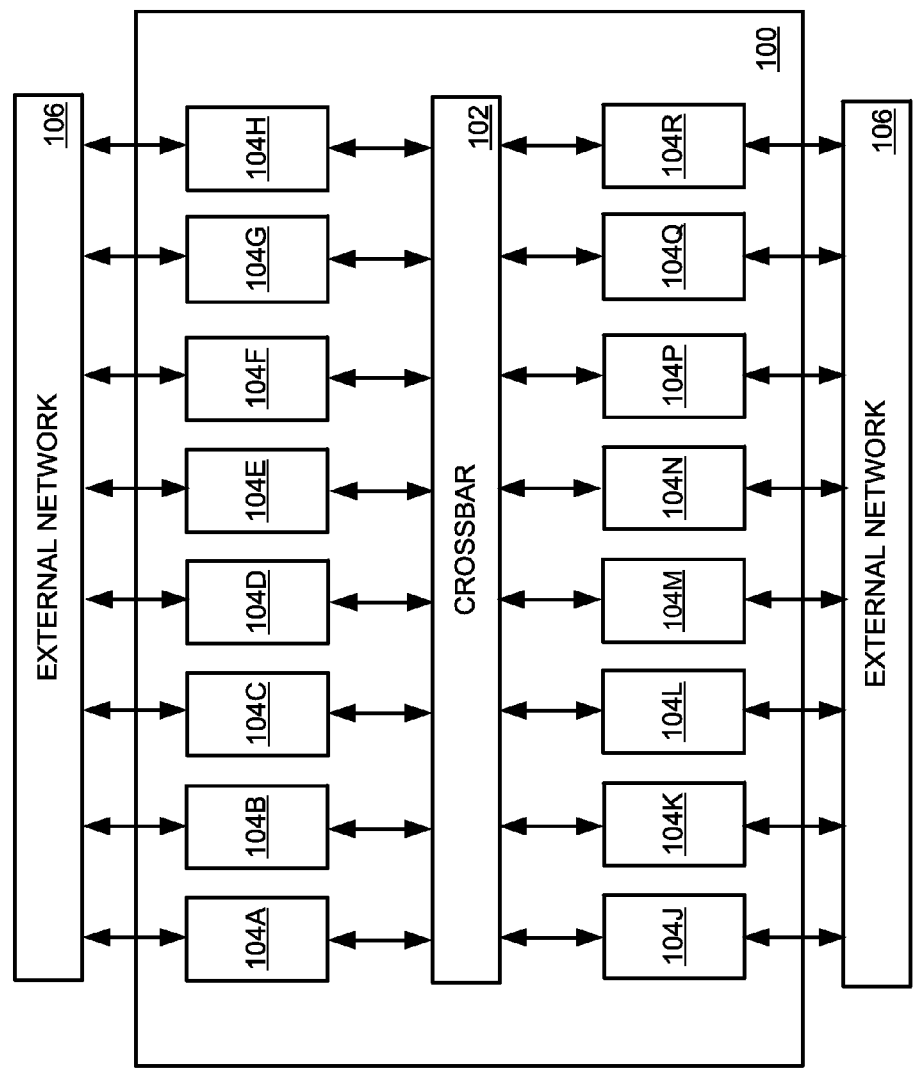
FIG. 1 is a circuit diagram illustrating an example of a network fabric switch.

FIG. 1 is a circuit diagram illustrating an example of a network fabric switch 100. As described above, a network fabric switch 100 provides switching capabilities in networking environments, such as computing networks and/or enterprise data centers. In particular, the switch 100 may include any number of input/output ports 104A-R that receive data from an external source 106 and/or transmit received data to the external source. The switch 100 illustrated in FIG. 1 includes 16 such ports 104A-R. However, the switch 100 may include any number of I/O ports. As mentioned, the external sources or network 106 provide data in one or more packets to the switch 100 for transmission to other components in the network. The data is transmitted through the ports 104A-R of the switch. Once a packet is received on one of the ports 104A-R, the packet may then be transmitted across the crossbar 102 of the switch 100 to any other I/O port for transmission out to the network 106. In this manner, data packets are received at the switch 100 from the network 106, transmitted to any other port 104A-R of the switch, and sent out to another portion or component of the network.

In one particular example, the switch 100 is an Infiniband-type fabric switch. In other words, the switch 100 operates on the Infiniband standard for fabric switches. As mentioned above, the switch 100 may include any number of I/O ports 104A-R. In the Infiniband example above, the switch 100 includes 42 such ports and is capable of switching up to 100 Gbps of data rate per port. However, the details of the present disclosure may apply to any type of switch or fabric switch that utilizes a VOQ linked list management scheme, as explained in more detail below.

In some types of fabric switches, the switch 100 may also include one or more virtual lanes associated with each or some of the ports 104A-R. A virtual lane is a method by which an output port 104A-R of the switch 100 can apply one or more priorities on transmission of data through the port. For example, a port 104A-R of the switch 100 may include 16 virtual lanes, with each virtual lane apply a policy (such as a priority) to each virtual lane. Thus, the total virtual output complexity of the switch 100 includes the number of total ports in the switch multiplied by the number of virtual lanes created for each port. As should thus be appreciated, the total output complexity of the switch 100 can be quite complicated.

Similarly, some fabric switches 100 utilize one or more VOQs associated with the input ports of the switch. Generally, VOQ provide a virtual queue associated with each input port of the switch for each output port or virtual lane of the switch. Thus, each input port may maintain a VOQ for each output port or virtual lane of the output ports created within the switch. As such, the total number of VOQs maintained by a switch may be the same as the output complexity of the switch 100 mentioned above, namely the number of total ports in the switch multiplied by the number of virtual lanes created for each port, providing even more complexity to the management of the fabric switch 100.

Each VOQ of the switch may act as a buffer or input queue for incoming data packets to the switch 100. In particular, as an input port 104A-R receives a data packet, the information contained in the packet may be stored in memory as it waits to be transmitted out of an output port. As such, each incoming data packet is stored in memory in such a manner as the data packets can be easily and quickly accessible by the switch 100 for transmission out of the switch. When the output port associated with the VOQ is ready to transmit one or more of the stored data packets, the switch 100 may access the stored data packets from memory and transmit the packet out of the assigned output port.

Figure 2:
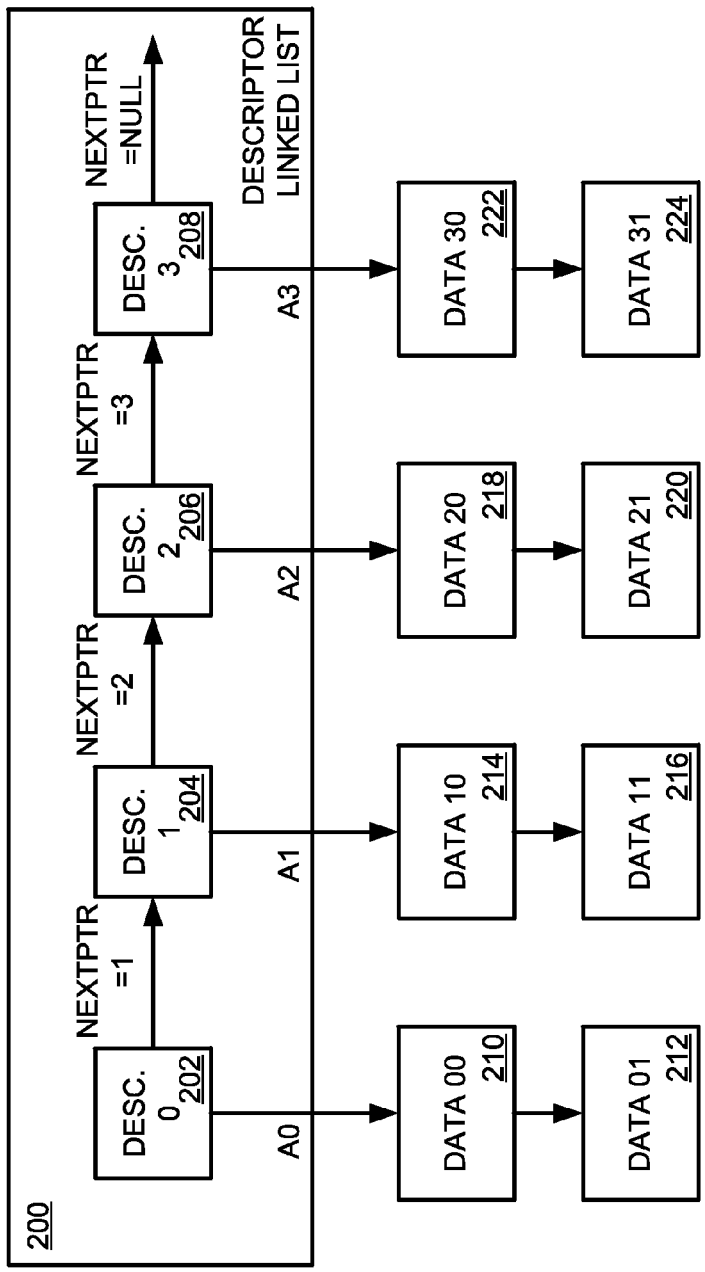
FIG. 2 is a block diagram illustrating a linked list virtual output queue management scheme for a network fabric switch.

FIG. 2 is a block diagram illustrating a linked list 200 VOQ management scheme for a network fabric switch to manage the storage of incoming data packets in memory of the system. In particular, the linked list 200 illustrated in FIG. 2 is associated with VOQ of an input port 104A-R of the switch 100. The switch 100 manages the linked list 200 of descriptors to aid the system in quickly storing incoming packets and accessing data packets for transmission through an output port of the system.

In general, the linked list 200 of the VOQ includes one or more descriptors 202-208. Each descriptor 202-208 in the linked list 200 includes a memory address of a block of data stored in memory. For example, descriptor 0 (202) in the linked list 200 of FIG. 2 includes a memory address (A0). Memory address A0 is the virtual location in memory of data block 00 (210). As described in more detail below, memory address A0 may also include data block 01 (212), depending on the storage management and capacity of the switch 100. In addition to the memory address A0 to a block or blocks of data, the descriptors 202-208 of the linked list 200 may also include a pointer to the next descriptor in the linked list. In particular, each descriptor 202-208 may include a stored value labeled NEXTPTR that points to or otherwise indicates the next descriptor in the linked list. For example, descriptor 0 (202) includes a NEXTPTR value of 1, indicating that the next descriptor in the linked list 200 is descriptor 1 (204). Similar to descriptor 0 (202), descriptor 1 (204) includes a memory address A1 where a memory block 214 is stored, but also includes a NEXTPTR value of 2 to indicate the next descriptor in the linked list 200. The last descriptor in the linked list 200 (in this example, descriptor 3 (208)) may include a NEXTPTR value of NULL to indicate that it is the last descriptor in the linked list. In this manner, the switch 100 maintains a linked list 200 of memory locations at which incoming data packets are stored before being transmitted from the switch.

As should be appreciated, descriptors 202-208 in the linked list 200 are created as data packets arrive at the switch and are queued and are deleted as data packets are read out from memory and transmitted. Further, in some embodiments, the descriptors 202-208 may include metadata about the stored data packets, such as packet lengths, input port, etc. Also, the descriptors 202-208 themselves may be stored in storage elements, such as the memory of the switch or one or more flip-flop circuit devices.

The total number of descriptors 202-208 included in the linked list 200 queue is a function of the total supported packet memory/block size. For example, an Infiniband-type fabric switch 100 may store incoming data packets in 32 bytes (B) chunks. However, the switch 100 may be able to manage up to 64B at any one time. This determines the size of the memory blocks utilized by the switch 100 to ensure efficient and fast memory use. Thus, in the example shown in FIG. 2, each memory block 210-224 may represent 32B of data such that each descriptor 202-208 includes memory address pointers to 64B of total data stored from incoming data packets. However, the switch 100 may manage the size and storage of the data blocks in any manner, such that more or fewer data blocks may be associated with a memory address than shown in FIG. 2, and the size of each stored data block may vary. For example, each memory block may represent 16B of data such that four data blocks may be associated with a memory address in a 64B system. As should be appreciated, if the block size supported by the switch 100 is small and/or the total memory supported is large, the number of descriptors 202-208 in the linked list 200 is also large.

In general, to meet the throughput requirement of the switch 100 of reading and writing data to memory, the linked list descriptors 202-208 should be accessed faster than the access time for the data (even with a heavily pipelined design). In other words, to keep up with the incoming data rate of data packets, the next descriptor read of the linked list 200 should finish before the packet data 212 from the first descriptor 202 read is completed. Otherwise, data blocks are stored in memory at a faster rate than the data blocks can be located and retrieved from memory by the switch 100. This results in a backlog of data blocks in memory that can quickly overwhelm the performance of the switch. In FIG. 2, the read of descriptor 1 (204) should finish before data block 01 (212) is read so that the next read can be issued to data block 10 (214) without having to wait for the information in descriptor 1 to be accessed. Memory latency and clock frequency of the switch 100 generally affect the ability of the switch to read the data and to keep up with the required data throughput rate.

Typical on chip memory latency is about three clock cycles, which may include parity and/or error correction code (ECC) calculations and checking time. Thus, even with pipelined reads, the switch 100 may fall behind the read of the incoming packet data. One method to overcome this issue is to increase the clock frequency of the memory read to compensate for the three clock cycles (in this case by 33%). However, in a high-performing fabric switch, increasing the clock frequency for memory reads may have implications for power consumption and valuable chip area.

Figure 3:
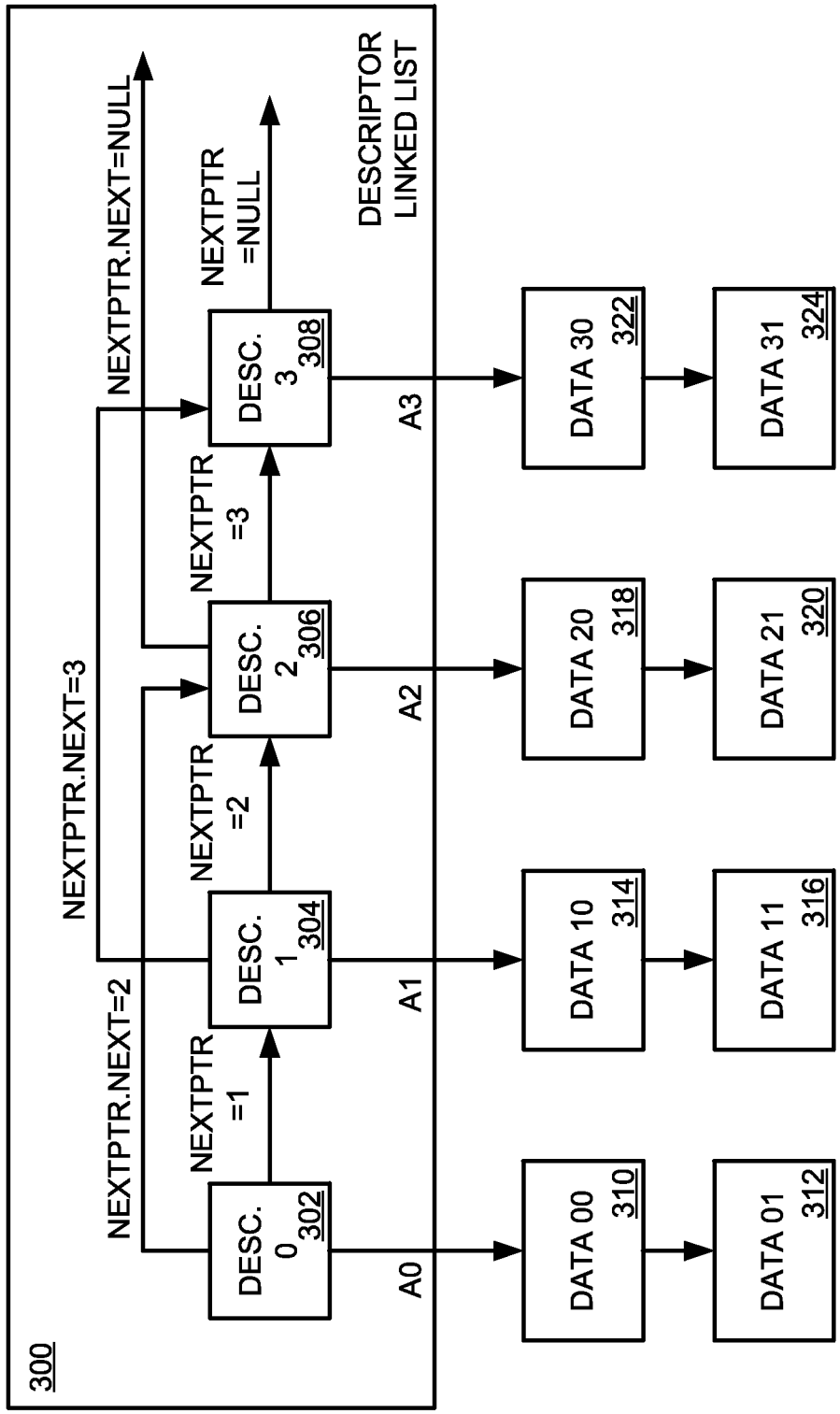
FIG. 3 is a block diagram illustrating a linked list virtual output queue management scheme for a network fabric switch that utilizes a look-ahead link associated with descriptors of the linked list.

As such, FIG. 3 is a block diagram illustrating an alternative linked list 300 VOQ management scheme for a network fabric switch 100 that utilizes a look-ahead link associated with descriptors 302-308 of the linked list. In general, the linked list 300 of FIG. 3 is similar to the linked list 200 described above with reference to FIG. 2. Namely, the linked list 300 includes one or more descriptors 302-308, with each descriptor including a virtual address memory location (A0-A3) and a NEXTPTR value that indicates the next descriptor in the linked list. As such, similar features of the linked list 300 of FIG. 3 and the linked list 200 of FIG. 2 include similar numerical identifiers. Further, the size and number of data blocks associated with each descriptor 302-308 may be different than that illustrated in FIG. 3, as determined by the operating features of the switch.

As indicated in the Figure, each descriptor 302-308 may include a value for NEXTPTR.NEXT in addition to the memory location and NEXTPTR value. The NEXTPTR.NEXT value associated with a descriptor 302-308 of the linked list 300 indicates the descriptor in the linked list that follows the next descriptor in the list. For example, descriptor 0 (302) includes the memory location A0 and NEXTPTR value of 1, indicating that descriptor 1 (304) is the next descriptor in the linked list 300. In addition, descriptor 0 (302) includes the NEXTPTR.NEXT value of descriptor 2 (306). As explained in more detail below, the NEXTPTR.NEXT value allows the switch to look-ahead when reading the linked list 300 to schedule memory reads and avoid delays in accessing the data packets 310-324. As also show, the next to last descriptor in the linked list 300 includes a NEXTPTR.NEXT value of NULL to indicate that there is no descriptor in the linked list after the next descriptor.

Utilizing this look-ahead feature of the linked list 300, a more efficient read of the stored data packets may be achieved. For example, when descriptor 0 (302) is read by the switch, a NEXTPTR value of 1 and a NEXTPTR.NEXT value of 2 is determined. At this point, the reads for data block 10 (314) and data block 20 (318) can be scheduled back to back. In effect, the switch is not waiting for the results from the read of descriptor 1 (304) to get to descriptor 2 (306) so that the switch is able to schedule the read to the data packets associated with descriptor 2 even before descriptor) is read. This results in back to back reads being issued to the descriptor list and the ability to read the data blocks 310-324 at the same rate as the reads of the descriptors 302-308, rather than having to wait for the reads of the descriptors individually before the data packets can be accessed. With the above described scheme, a pipelined access is achieved to work on descriptors that are chained even with a larger access time.

Figure 4:
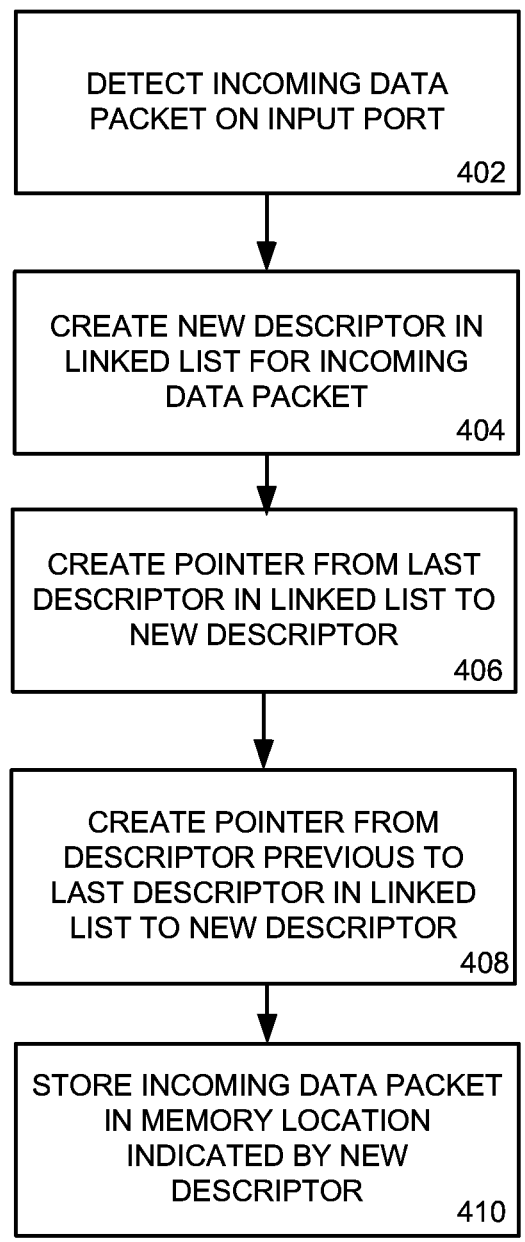
FIG. 4 is a flowchart of a method for data writes to a linked list virtual output queue management scheme utilizing look-ahead links.

FIG. 4 is a flowchart of a method for data writes to a linked list VOQ management scheme utilizing look-ahead links. Generally, the operations of the flowchart of FIG. 4 are performed by a fabric switch, either through hardware components, software programs, or a combination of hardware and software. The flowchart of FIG. 4 illustrates how a switch creates the linked list with a look-ahead feature as data packets are received at the switch for transmission through an output port of the switch. Reference is made to the linked list 300 of FIG. 3 as an example of such a linked list with a look-ahead feature. However, the operations of FIG. 4 are not limited to the example shown in FIG. 3.

Beginning in operation 402, the switch 100 detects the presence of an incoming data packet from an external network or component. In operation 404, the switch 100 creates a new descriptor for the linked list 300 associated with the incoming data. In general, the descriptor is provided with an indicator that suggests the location of the descriptor within the linked list. For example, if the last descriptor in the linked list 300 is indicated as descriptor 2 (306), the newly created descriptor may be indicated as descriptor 3 (308). It should be appreciated however, that the switch 100 may identify or order the descriptors in the linked list 300 in any fashion using any type of indicators or identifiers. Further, the new descriptor may include a memory address or memory location in which data may be stored in the memory of the switch.

In operation 406, the switch 100 creates a pointer from the last descriptor in the linked list 300 to the newly created descriptor. In some instances, this may not be possible. For example, if the created descriptor is the first descriptor in the linked list 300, than this operation is not performed by the switch. However, if other descriptors already exist in the linked list 300 (such as when other data packets have already been received by the switch and stored), a pointer from the last descriptor to the new descriptor is created. Similarly, in operation 408, the switch creates a pointer from the new descriptor to the descriptor in the linked list 300 descriptor previous to the last descriptor in the list. In operation 410, the switch 100 stores in the incoming data packet in a memory location associated with the new descriptor, described above.

In one embodiment, the switch 100 creates the pointers discussed in relation to FIG. 4 by populating or providing a value in a NEXTPTR and NEXTPTR.NEXT field associated with the descriptors. For example, assume that the switch 100 is adding descriptor 3 (308) in the linked list 300 of FIG. 3. To add the descriptor, the switch 100 may provide descriptor 2 (306) with NEXTPTR value of 3, indicating that descriptor 3 follows descriptor 2 in the linked list 300. In addition, the switch 100 also provides descriptor 1 (304) with NEXTPTR.NEXT value of 3, indicating that new descriptor 3 (308) is the descriptor following the next descriptor in the linked list in relation to descriptor 1. In addition, the switch 100 may, in some circumstances, provides the new descriptor with NULL values in both the NEXTPTR and NEXTPTR.NEXT fields associate with the new descriptor. The NULL values indicate that the new descriptor is the last descriptor in the linked list 300. Further, these values may be filled in when future descriptors are added to the list in a manner similar to the operations and methods described above.

Figure 5:
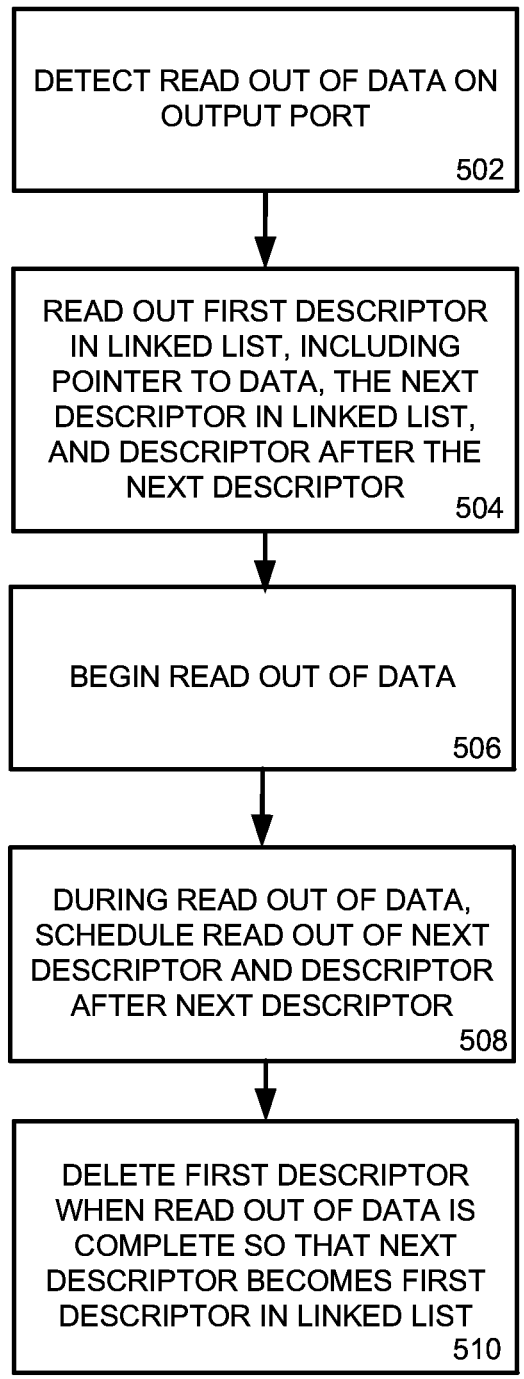
FIG. 5 is a flowchart of a method for reads from a linked list virtual output queue management scheme utilizing look-ahead links.

FIG. 5 is a flowchart of a method for reads from a linked list 300 VOQ management scheme utilizing look-ahead links. The method of FIG. 5 may be performed by a fabric switch to read out stored data (such as incoming data packets) that are stored in a linked list such as that described above with reference to FIGS. 3 and 4. Generally, the operations of the flowchart of FIG. 5 are performed by a fabric switch, either through hardware components, software programs, or a combination of hardware and software. Reference is made to the linked list 300 of FIG. 3 as an example of such a linked list with a look-ahead feature. However, the operations of FIG. 5 are not limited to the example shown in FIG. 3.

Beginning in operation 502, the switch 100 may determine that a read out of data from the VOQ is requested. This may occur when an output port associated with the VOQ is available to transmit data. Beginning at the first descriptor in the linked list 300, the switch reads the information of or otherwise associated with the first descriptor in operation 504. Such information may include a memory address or location in which data to be transmitted is stored, a pointer to the next descriptor in the linked list 300, and a pointer to the descriptor in the linked list after the next descriptor. This information may be obtained through a NEXTPTR value and NEXTPTR.NEXT value associated with the first descriptor. For example, the switch 100 may read descriptor 0 (302) of the linked list 300 of FIG. 3. By reading the descriptor, the switch 100 may determine address location A0 associated with the descriptor, NEXTPTR value 1 (indicating that descriptor 1 (304) is the next descriptor in the list), and NEXTPTR.NEXT value 2 (indicating that descriptor 2 (306) is the descriptor after the next descriptor in the linked list). This information may then be utilized by the switch to schedule one or more memory reads, as described in more detail below.

Returning to FIG. 5, the switch 100 may begin reading out data from the memory at the address location associated with the read descriptor in operation 506. Continuing the above example, data block 00 (310) is read out of the memory at address A0. During read out of the data block from memory, the switch 100 may schedule a read out of the next descriptor (indicated by the NEXTPTR value associated with the first descriptor) and a read out of the descriptor after the next descriptor (indicated by the NEXTPTR.NEXT value associated with the first descriptor) in operation 508. In the example above, read out of descriptor 1 (304) and descriptor 2 (306) is scheduled by the switch 100. In this manner, the switch 100 can begin reading the information in both descriptor 1 (304) and descriptor 2 (306) at the same time to increase the efficiency of the read out the linked list 300, rather than waiting to access descriptor 2 only after descriptor 1 is read.

In operation 510, the switch 100 may delete the first descriptor once the read out of the data from the memory address associated with first descriptor is completed and transmitted out of the switch. By deleting the first descriptor, the next descriptor in the linked list 300 now becomes the first descriptor and the above operations may be repeated to continue reading out the data stored in the VOQ linked list. Further, because the look-ahead links in the linked list allows the switch to schedule reads of memory locations included in the descriptors at the same speed at which the data packets are stored in memory, the efficiency of the switch is maintained without the need to provide an increased clock frequency for memory reads.

In addition, the VOQ linked list management scheme described herein may be scalable based on the width of the datapath for the switch. For example, in the system described above, the number of look-ahead pointers is one based on the system configuration of storing two data chunks at each memory location. However, in a system where the datapath width is 16B rather than 32B, four data chunks may be stored at each memory location (to coincide with the system requirement of accommodating 64B of incoming data). In such a system, the VOQ linked list management scheme may maintain four look-ahead pointers to keep up with the incoming data rate. In this manner, the VOQ linked list management scheme is scalable in relation to the incoming datapath width. In general, any number of look-ahead pointers may be maintained in the VOQ linked list management scheme based on the datapath width of the particular switch. In this manner, the VOQ linked list management scheme described herein may be scalable based on the datapath width or latency of the incoming packets.

Figure 6:
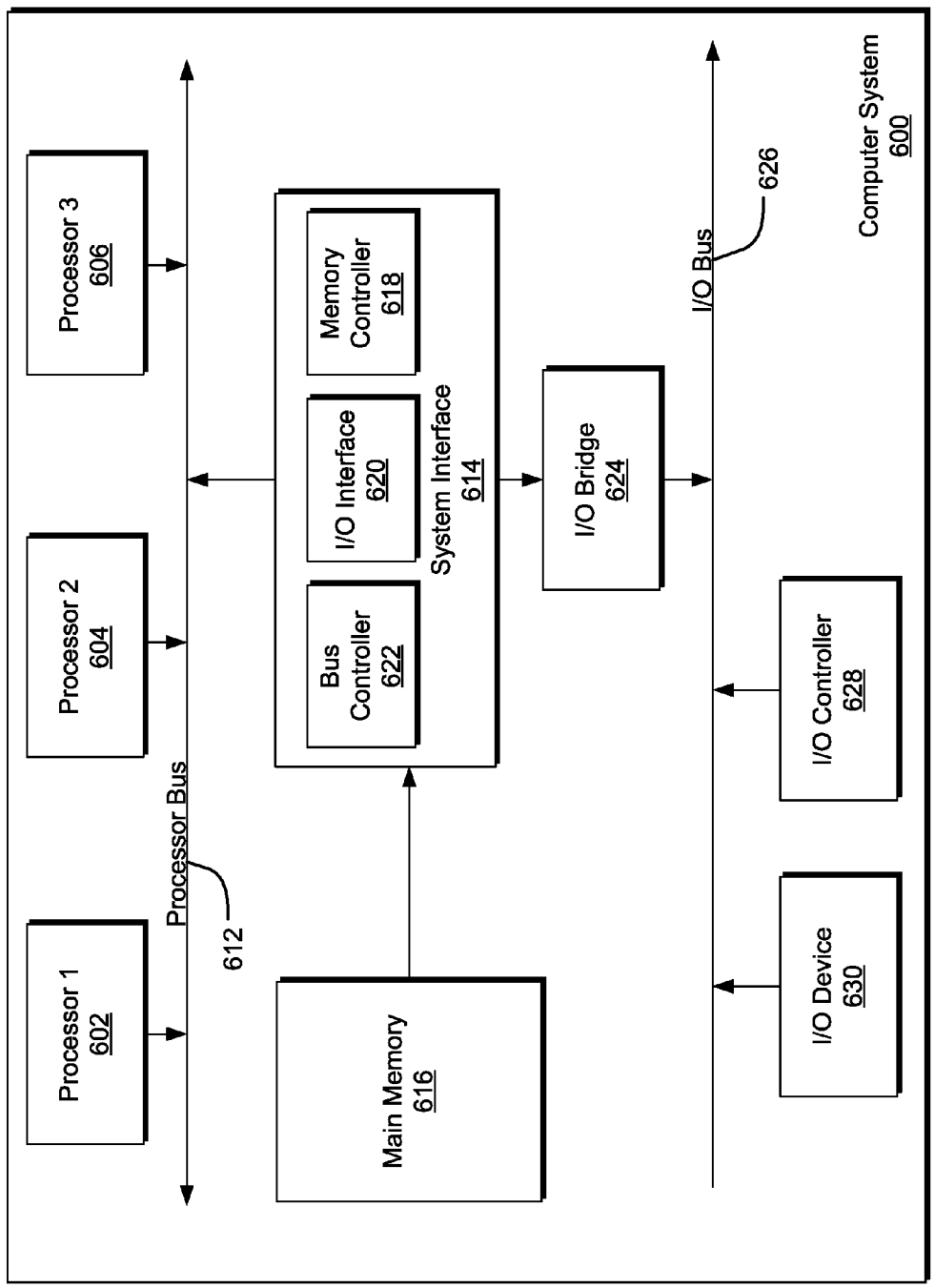
FIG. 6 is a block diagram illustrating an example of a computing system which may be used in implementing embodiments of the present disclosure.

FIG. 6 is a block diagram illustrating an example of a computing device or computer system 600 which may be used in implementing the embodiments of the fabric switch disclosed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more input/output bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 4 and 5 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for managing a virtual output queue for a network fabric switch, the method comprising:
    maintaining a linked list of a plurality of descriptors, wherein each of the plurality of descriptors comprises:
        a memory address location at which at least a portion of data from an input data packet is stored;
        a next descriptor pointer indicating a next descriptor in the linked list of the plurality of descriptors; and
        a look ahead pointer indicating a look ahead descriptor in the linked list of the plurality of descriptors, the look ahead descriptor the next descriptor in the linked list following the next descriptor;
    wherein maintaining the linked list of the plurality of descriptors comprises:
        detecting the input data packet at an input port of the network fabric switch;
        inserting a new descriptor at an end of the linked list; and
        determining a previous last descriptor in the linked list; and
    wherein obtaining the at least a portion of data from the input data packet comprises scheduling a read of the next descriptor based at least on the next descriptor pointer and a read of the look ahead descriptor based at least on the look ahead pointer.

2. The method of claim 1 wherein maintaining the linked list of the plurality of descriptors further comprises:
    associating a new next descriptor pointer value with the previous last descriptor in linked list of the plurality of descriptors, the new next descriptor pointer value indicating the new descriptor at the end of the linked list.

3. The method of claim 2 wherein maintaining the linked list of the plurality of descriptors further comprises:
    associating a new look ahead descriptor pointer value with a look ahead descriptor in the linked list of the plurality of descriptors, the look ahead descriptor previous to the previous last descriptor, wherein the new next descriptor pointer value indicates the new descriptor at the end of the linked list.

4. The method of claim 3 wherein maintaining the linked list of the plurality of descriptors further comprises:
    associating a data packet memory storage location with the new descriptor; and
    storing at least a portion of the input data packet at the data packet memory storage location.

5. The method of claim 1 wherein obtaining the at least a portion of data from the input data packet further comprises determining a first descriptor memory address location associated with the first descriptor in the linked list of the plurality of descriptors, a first descriptor next descriptor pointer indicating a next descriptor in the linked list of the plurality of descriptors, and a first descriptor look ahead pointer indicating a look ahead descriptor in the linked list of the plurality of descriptors.

6. The method of claim 5 wherein obtaining the at least a portion of data from the input data packet further comprises:
    reading the at least a portion of data from the input data packet from the first descriptor memory address location associated with the first descriptor in the linked list of the plurality of descriptors; and
    deleting the first descriptor from the linked list of the plurality of descriptors after the at least a portion of data from the input data packet is read.

7. The method of claim 6 wherein the at least a portion of data from the input data packet at the first descriptor memory address location is stored in a data block of a particular size, based at least on a configuration of the network fabric switch.

8. The method of claim 7 wherein the particular size of the data block is 32 bytes and the network fabric switch is an Infiniband-type fabric switch.

9. A network fabric switch comprising:
    a plurality of input/output (I/O) ports, each I/O port configured receive data packets from a network; and
    a fabric switch controller configured to maintain a virtual output queue for each of the other I/O ports of the plurality of I/O ports, each virtual output queue comprising a linked list of a plurality of descriptors, wherein each of the plurality of descriptors comprises:
        a memory address location at which at least a portion of data from an input data packet received at least one of the plurality of I/O ports is stored;

a next descriptor pointer indicating a next descriptor in the linked list of the plurality of descriptors; and a look ahead pointer indicating a look ahead descriptor in the linked list of the plurality of descriptors, the look ahead descriptor the next descriptor in the linked list following the next descriptor; and wherein the fabric switch controller is further configured to maintain the linked list of the plurality of descriptors of the virtual output queues by:

detecting the input data packet at the at least one of the plurality of I/O ports of the network fabric switch;

inserting a new descriptor at an end of the linked list; and determining a previous last descriptor in the linked list.

10. The network fabric switch of claim 9 wherein the fabric switch controller is further configured to maintain the linked list of the plurality of descriptors of the virtual output queues by:

associating a new next descriptor pointer value with the previous last descriptor in linked list of the plurality of descriptors, the next descriptor pointer value indicating the new descriptor at the end of the linked list.

11. The network fabric switch of claim 10 wherein the fabric switch controller is further configured to maintain the linked list of the plurality of descriptors of the virtual output queues by:

associating a new look ahead descriptor pointer value with a look ahead descriptor in the linked list of the plurality of descriptors, the look ahead descriptor previous to the previous last descriptor, wherein the new next descriptor pointer value indicates the new descriptor at the end of the linked list.

12. The network fabric switch of claim 11 wherein the fabric switch controller is further configured to maintain the linked list of the plurality of descriptors of the virtual output queues by:

associating a data packet memory storage location with the new descriptor; and storing at least a portion of the input data packet at the data packet memory storage location.

13. The network fabric switch of claim 9 wherein the fabric switch controller is further configured to maintain the linked list of the plurality of descriptors of the virtual output queues by:

determining a first descriptor memory address location associated with the first descriptor in the linked list of the plurality of descriptors, a first descriptor next descriptor pointer indicating a next descriptor in the linked list of the plurality of descriptors, and a first descriptor look ahead pointer indicating a look ahead descriptor in the linked list of the plurality of descriptors.

14. The network fabric switch of claim 13 wherein the fabric switch controller is further configured to maintain the linked list of the plurality of descriptors of the virtual output queues by:

scheduling a read of the next descriptor based at least on the next descriptor pointer and a read of the look ahead descriptor based at least on the look ahead pointer.

15. The network fabric switch of claim 14 wherein the fabric switch controller is further configured to maintain the linked list of the plurality of descriptors of the virtual output queues by:

reading the at least a portion of data from the input data packet from the first descriptor memory address location associated with the first descriptor in the linked list of the plurality of descriptors; and deleting the first descriptor from the linked list of the plurality of descriptors after the at least a portion of data from the input data packet is read.

16. The network fabric switch of claim 13 wherein the at least a portion of data from the input data packet at the first descriptor memory address location is stored in a data block of a particular size, based at least on a configuration of the network fabric switch.

17. The network fabric switch of claim 16 wherein the particular size of the data block is 32 bytes and the network fabric switch is an Infiniband-type fabric switch.

* * * * *